LATCHING MEANS FOR AN AUTOMOBILE DOOR
Filed Sept. 28, 1959 3 Sheets-Sheet 1
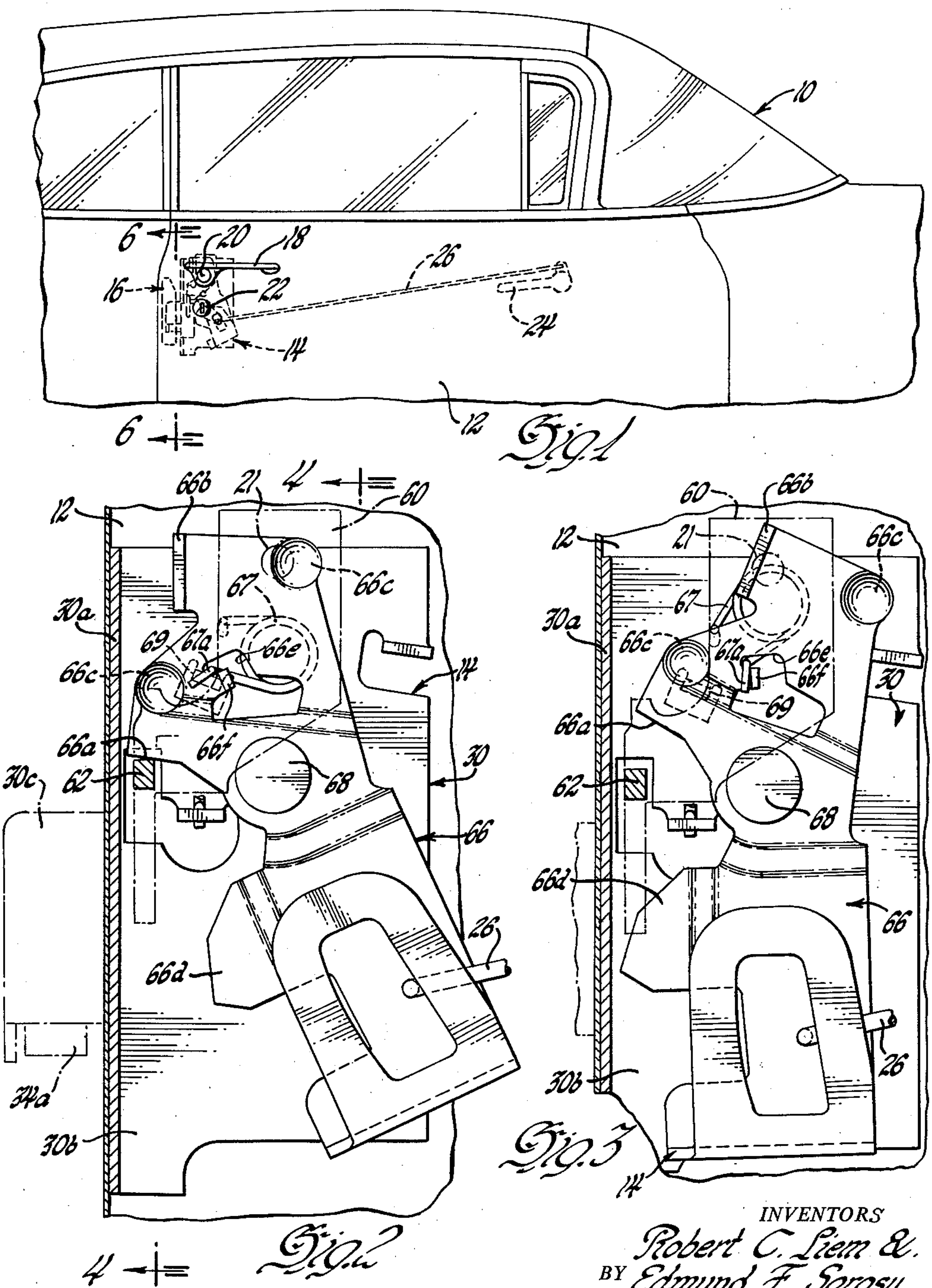
INVENTORS
Robert C. Liem &
BY Edmund F. Sarosy
W. S. Pettigrew
ATTORNEY April 24, 1962 R. C. LIEM ET AL 3,031,221
LATCHING MEANS FOR AN AUTOMOBILE DOOR
Filed Sept. 28, 1959 3 Sheets-Sheet 2
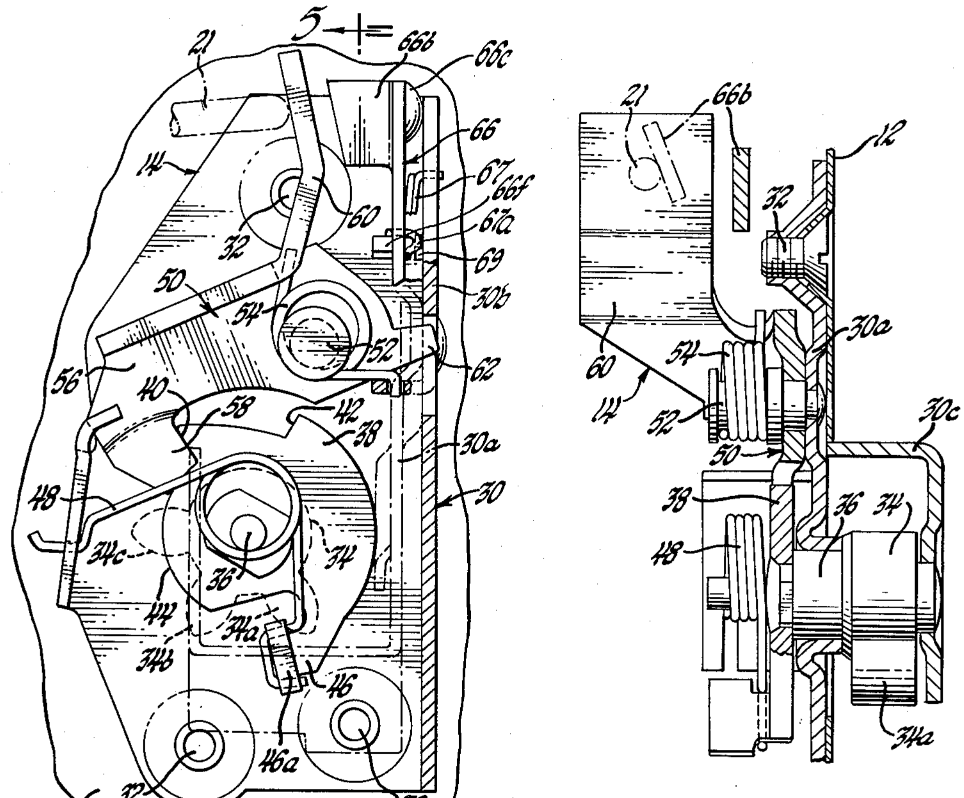
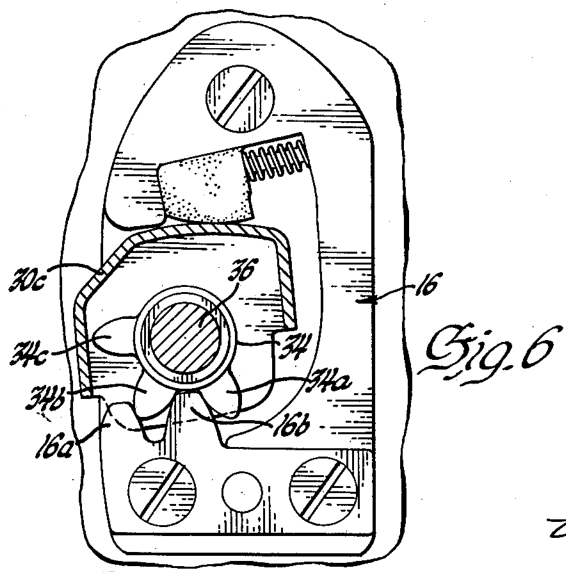
INVENTORS
Robert C. Liem &
BY Edmund F. Sarosy
W. S. Pettigrew
ATTORNEY April 24, 1962 R. C. LIEM ET AL 3,031,221
LATCHING MEANS FOR AN AUTOMOBILE DOOR
Filed Sept. 28, 1959 3 Sheets-Sheet 3
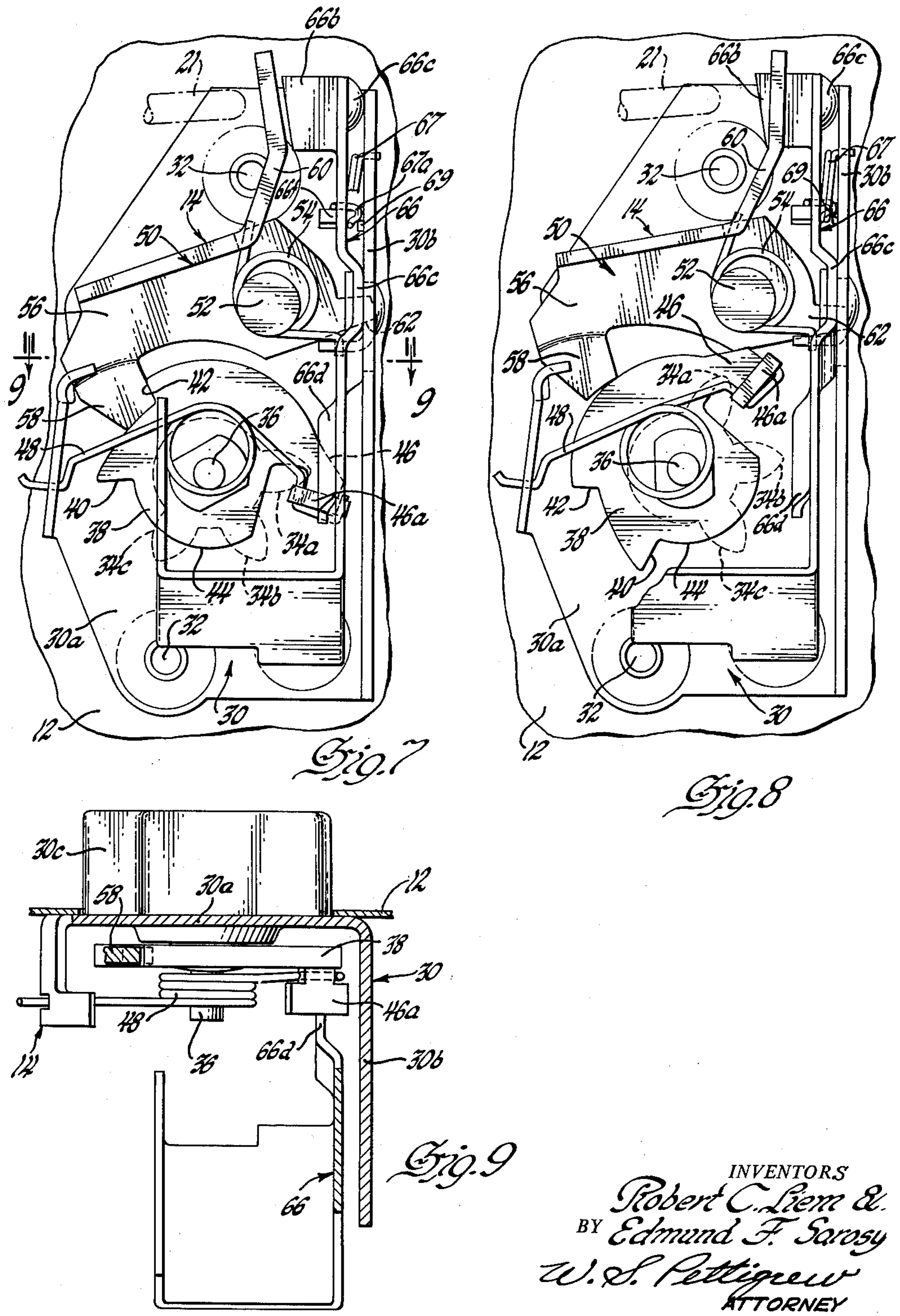
INVENTORS
Robert C. Liem &
BY Edmund F. Sarosy
W. S. Pettigrew
ATTORNEY 3,031,221
Patented Apr. 24, 1962

3,031,221

LATCHING MEANS FOR AN AUTOMOBILE DOOR

Robert C. Liem, Livonia, and Edmund F. Sarosy, Detroit, Mich., assignors to General Motors Corporation, Detroit, Mich., a corporation of Delaware Filed Sept. 28, 1959, Ser. No. 842,721
12 Claims. (Cl. 292—216)

This invention relates to vehicle door latching apparatus, and more particularly to improved latching means for an automobile door.

One feature of the invention is that it provides an improved door latch; another feature of the invention is that it provides a door latch having means for blocking movement of the locking lever to locked position in the event the latch parts are in safety latched position so that a false indication of security is avoided; another feature of the invention is that it provides an operating lever in the latch which is movable in one direction from a normal position to a locked position and movable in the opposite direction from said normal position to a door unlatched position, an overcenter spring which selectively yieldably biases said lever in normal position and in locked position, together with means for blocking the spring against movement during movement of the lever from normal position to door unlatched position to avoid placing an unlatching bias on the lever; and still a further feature of the invention is that the latch includes an anti-jam arrangement whereby the bolt has teeth only partially around its periphery and the ratchet plate, which is effectively integral with the bolt and which forms part of the latching means, has a cam surface for slidably supporting the holding foot of the detent to permit free overtravel of the bolt in a latching direction so that if the bolt should inadvertently be placed in latched position while the door is open and the door is subsequently closed, the bolt will turn as it rides over the teeth of the striker until the last tooth of the bolt latches with the safety latching tooth of the striker. With this arrangement, the parts will not jam in the event the bolt is placed in latched position while the door is open and then the door is subsequently closed, and an indication of this condition will be given because the door can neither be opened nor fully closed without first releasing the detent to permit the bolt to return to its normal unlatched position.

Other features and advantages of the invention will be apparent from the following description and from the drawings, in which:

FIG. 1 is a fragmentary side elevational view of an automobile incorporating the novel door latch in the front door, the latch parts inside the door being shown in broken lines;

FIG. 2 is an enlarged longitudinal vertical section through the door showing the latch in section with the parts in unlocked position;

FIG. 3 is a view similar to FIG. 2 but with the parts in locked position;

FIG. 4 is a section taken at right angles to FIG. 2 along the line 4—4 thereof, showing the parts in fully latched position;

FIG. 5 is a section taken along the line 5—5 of FIG. 4;

FIG. 6 is a section showing the bolt and striker taken along the line 6—6 of FIG. 1;

FIG. 7 is a section similar to FIG. 4 but showing the parts in safety latched position;

FIG. 8 is a section similar to FIG. 4 but showing the parts in latch-released position; and FIG. 9 is a transverse section taken along the line 9—9 of FIG. 7.

Referring now more particularly to the drawings, the reference numeral 10 designates an automobile having a door 12 which is hingedly mounted at its front edge on the automobile body in conventional manner (not shown) and which carries a latch designated generally as 14 having a bolt which cooperates with a striker 16 mounted on the automobile body. On the outer panel of the door 12, there is mounted a fixed gripping handle 18 which carries a slidable push button 20 having a push rod 21 (see FIGS. 4, 5, 7, and 8) for operation of the latch from outside the door. A conventional key cylinder device 22 is mounted in the door below the handle 18 for connection in conventional manner to a locking lever in the door latch. This connection is not shown since it forms no part of the invention. For inside operation there is a turn handle 24 swingably mounted on the inner panel of the door and connected to the latch by a remote rod 26.

The latch has a frame designated generally as 30 and including a body portion **30*a* which lies against the inner surface of the jamb face of the door 12 and which is secured thereto by a plurality of bolts 32. A flange portion 30*b* extends at right angles from the body of the frame and lies parallel to the inner panel of the door 12. A bolt 34 is pivotally mounted on the body 30*a* of the latch frame on a stub shaft 36 which is journaled in the frame and in the outer wall of a bolt housing portion 30*c* of the frame. As seen best in FIG. 6, the bolt is formed with three radial peripheral teeth 34*a*, 34*b*, and 34*c* which engage complementary teeth 16*a* and 16*b* on the striker when the door is closed. On the other side of the body portion 30*a* of the latch frame there is a latch plate 38 which is fixedly secured to the stub shaft 36 so that the bolt 34, the shaft 36, and the latch plate 38 comprise a unitary latching means. The latch plate is formed with a first latching notch 40 and a second latching notch 42, these notches cooperating with the detent, later to be described, to define fully latched and safety latched positions of the latching means. Extending around the periphery of the latch plate 38 from the first latching notch 40, there is a cam surface 44 which is arcuate about the center of the shaft 36 and which is the same distance from said shaft as is the bottom of the first latching notch 40. This cam surface slidably supports the detent in the event of overtravel of the bolt in latching direction in a manner and for a purpose later to be described. A stop arm 46 projects outwardly from the latching plate 38 to limit pivotal movement of the latching means in an unlatching direction (counterclockwise as the parts appear in FIG. 4), and a turned foot 46*a* on the free end of the arm 46 provides means for blocking the locking lever from being moved to locking position in the event the latching means is in safety latched position. Both these features will be described later in detail. A spring 48 is mounted on the shaft 36 and has one end hooked into the latch frame and the other end hooked on the latching plate 38** to provide a bias for the latching means in a counterclockwise or unlatching direction.

In order to hold the latching means in fully latched (FIG. 4) or safety latched (FIG. 7) position, there is a combined detent and release member 50 which is pivotally mounted on a stud 52 projecting from the latch frame. A spring 54 which is coiled about the stud 52 has one end connected to the latch frame and the other end connected to the member 50 to urge the member 50 into holding engagement with one of the notches 40, 42 in the latch plate 38.

The detent-release member 50 has a detent arm 56 which terminates in a projecting detent foot 58 adapted to engage one of the notches 40 or 42 in the latching plate to hold the latching means against rotary or pivotal movement in an unlatching direction. A second arm 60 extends upwardly from the stud 52 for engagement with the push rod 21 of the outside release means. A third arm 62 of the combined detent-release member extends into a slot in the flange portion **30*b* of the frame for engagement by a remote or inside release lever. In the event the detent is swung in a clockwise direction as the parts appear in FIGS. 4, 7 and 8, its foot 58 is moved out of holding engagement with the latching plate so that the latching means may rotate to the unlatched position illustrated in FIG. 8. Further rotation in an unlatching direction is prevented by abutment of the stop arm 46 with the detent member 50**.

Referring more particularly to FIGS. 2 and 3, a combined remote operating and locking lever designated generally as 66 is pivotally mounted on the flange **30*b* by means of a stud 68 projecting therefrom. The combined remote locking lever is connected at its lower end to the remote rod 26 which extends from the inside turn handle 24 so that turning the handle 24 in a counterclockwise direction, as the parts appear in FIG. 1, pushes on the rod 26 and swings the lever 66 in a clockwise direction from the unlocked position shown in FIG. 2 to the locked position shown in FIG. 3. Conversely, turning the handle 24 in a clockwise direction in FIG. 1 pulls on the rod 26, swinging the lever 66 in a counterclockwise direction so that a shoulder 66*a* on the lever picks up the detent-release arm 62 and swings it downwardly to swing the detent out of holding engagement with the latching means so that the door may be opened. Near the top of the lever 66, there is a right angular blocking flange 66*b* which, when the parts are in the unlatched position of FIG. 2, lies to one side of the path of release movement of the detent-release lever 50 but, when the parts are in the locked position of FIG. 3, lies directly in the path of release movement of the member 50, blocking release movement thereof. Dimples 66*c* are stamped into the locking remote lever 66** to provide bearing portions of this lever on the latch frame to permit the blocking action without jamming the lever against the frame.

An overcenter spring 67 is connected between the lever 66 and the latch frame. This spring passes overcenter during movement of the lever 66 from the unlocked position of FIG. 2 to the locked position of FIG. 3 so that the spring yieldably biases and holds the lever 66 either in locked or unlocked position. A blocking tab 69 is bent from the latch frame flange **30*b* and the spring 67 is formed adjacent its end with a blocking hump 67*a* (FIG. 4) for engagement with the tab 69 when the lever 66 is in its normal, unlocked position shown in FIG. 2. This block-out condition avoids placing an unlatching bias on the lever 66 and therefore relieves the pressure between the shoulder 66*a* on the lever and the detent-release arm 62. By virtue of this arrangement, the detent spring 54 may be smaller and lighter and the outside operating effort lower than would be the case if the spring 54 were working against the spring 67. Furthermore this arrangement takes spring 67 out of action during unlatching operation. As shown on FIGS. 2 and 3, the spring leg 67*a* makes a lost motion connection with lever 66, by means of sliding along in slot 66*e* and tab 66*f* of lever 66 during said operation. If the lever 66 is swung from its normal position of FIG. 2 to the locked position of FIG. 3, the spring 67** acts as a conventional overcenter spring.

In the event the door 12 is not completely closed so that the bolt teeth latch on the outer striker tooth **16*a* only and the door is in safety latched position, it is desirable to provide an indication of this condition by rendering the locking means inoperable. If the door is safety latched and the operator attempts to lock the latch, he will be unable to do so. This desirable result is achieved by the blocking foot 46*a* on the latching plate. When the latching means is held by the detent in safety latched position, as shown in FIG. 7, the blocking foot 46*a* lies in the path of swinging movement of the lower part of the locking lever 66, blocking movement of this locking lever from unlocked to locked position. The locking lever is formed with a cam portion 66*d* with surfaces arranged to engage the blocking foot 46*a* and cam the locking lever 66** out of the way in the event the latching means should stick in its rotary movement between safety latched and fully latched positions.

Another desirable feature of the invention is that it provides an anti-jam arrangement. Since the bolt 34 has teeth **34*a*, 34*b* and 34*c* extending only partially around its periphery; since the latching plate 34 has latching notches 40, 42 only at predetermined fully latched and safety latched positions; and since the latching means is urged by the spring 48 to a fully unlatched position, as shown in FIG. 8, wherein the blocking foot 46 strikes the bottom surface of the detent member 50 to prevent further rotation, it is evident that the latching means has only two proper positions where it is fully latched or safety latched as the case may be. In order to prevent jamming and breakage of parts in the event the bolt should inadvertently be moved to and held in latched position while the door is open and then the door is subsequently slammed shut, a structural arrangement is provided whereby the bolt may overtravel in a latching direction even though it has been previously set to an improper position so that it can only engage the outer or safety latching tooth 16*a* of the striker. Should the bolt be set to this position and the door slammed, the bolt teeth 34*b* and/or 34*a* will roll over the striker tooth 16*a* until the tooth 34*a* of the bolt latches with the safety latching or outer tooth 16*a* on the striker. The cam surface 44 on the latching plate 38 permits this overtravel, holding the detent foot 58 in its proper latching position and preventing jamming of the parts. With this arrangement, closing the door will cause the bolt to turn as its rides over the striker teeth and ultimately to latch in safety latched position. The detent will merely slide along the cam surface 44 during the overtravel of the bolt. Now, the door can neither be opened nor fully closed without first moving the detent to latch release position. An attempt to pull the door fully closed will merely cause the bolt to turn against the force of the spring 48, and when the pulling force is released, the spring will move the bolt back to its safety latched position since there is no latching notch in the cam surface 44** which the detent may engage. Thus, there is no possibility that the parts will jam or break if the bolt is inadvertently moved to and held in fully latched or safety latched position while the door is open and the door is subsequently slammed shut.

While we have shown and described one embodiment of our invention, it is capable of many modifications. Changes, therefore, in the construction and arrangement may be made without departing from the spirit and scope of the invention as set forth in the appended claims.

What is claimed is:

1. Vehicle door latching apparatus of the character described, including: a striker on the vehicle; a latch frame mounted on the door; latching means pivotally mounted on the frame for engagement with said striker when the door is closed, said latching means being movable to fully latched, safety latched, and unlatched positions; detent means movably mounted on the frame and adapted to hold said latching means in fully latched or safety latched position against movement in a door-opening direction; release means for moving said detent means to a latch-released position; locking means mounted on said frame for movement between an unlocked position wherein said release means is operable to move the detent and a locked position wherein said release means is inoperable; and means for blocking movement of said locking means into locked position when said latching means is in safety-latched position only, said blocking means being ineffective to block movement of said locking means when said latching means is in said fully latched and said unlatched positions.

2. Apparatus of the character claimed in claim 1, wherein said striker has a plurality of teeth, and wherein said latching means includes a bolt having a plurality of peripheral teeth adapted to engage complementary teeth on the striker to hold the door against movement in a door-opening direction.

3. Apparatus of the character claimed in claim 1, wherein said striker has a plurality of teeth thereon, and wherein said latching means includes a bolt having a plurality of peripheral teeth adapted to engage the teeth of the striker, and a latch plate rigid with said bolt and movable as a unit therewith, said latch plate being formed with a plurality of notches for engagement by said detent to define said fully latched and safety latched positions.

4. Apparatus of the character claimed in claim 1, wherein said locking means comprises a locking lever pivotally mounted on said frame for movement between an unlocked position wherein said release means is operable and a locked position wherein said lever blocks release movement of said detent.

5. Apparatus of the character claimed in claim 4, wherein said means for blocking movement of the locking means comprises a foot on said latching means for blocking movement of the locking lever into locked position when said latching means is in safety latched position.

6. Vehicle door latching apparatus of the character described, including: a toothed striker mounted on the vehicle; a latch frame mounted on the door; latching means pivotally mounted on the frame for engagement with said striker when the door is closed, said latching means being movable to fully latched, safety latched, and unlatched positions, and said latching means comprising a bolt having a plurality of peripheral teeth adapted to engage the teeth of the striker and a latch plate rigid with said bolt and pivotally movable as a unit therewith, said latch plate having a plurality of notches defining said fully latched and safety latched positions; detent means pivotally mounted on the frame and having a portion adapted to engage a selected one of said notches to hold said latching means in fully latched or safety latched position against movement in a door-opening direction; release means for moving said detent means to a latch released position; locking means comprising a locking lever pivotally mounted on said frame for movement between an unlocked position wherein said release means is operable and a locked position wherein said lever blocks release movement of the detent; and means for blocking movement of said locking means into locked position when said latching means is in safety latched position only, said blocking means being ineffective to block movement of said locking means when said latching means is in said fully latched and said unlatched positions.

7. Apparatus of the character claimed in claim 6, wherein said blocking means comprises a foot on said latch plate.

8. Vehicle door latching apparatus of the character described, including: a toothed striker mounted on the vehicle; a latch frame mounted on the door; latching means pivotally mounted on the frame for engagement with said striker when the door is closed, said latching means being movable to fully latched, safety latched, and unlatched positions, said latching means comprising a gear type bolt having a plurality of radial teeth extending partway around its periphery and adapted to engage the teeth of the striker when the door is closed, and a latch plate rigid with said bolt and pivotally and coaxially movable as a unit therewith, said latch plate having first and second peripheral notches defining said fully latched and safety latched positions; a detent pivotally mounted on the frame and having a portion adapted to engage a selected one of said notches to hold said latching means in fully latched or safety latched position against movement in a door-opening direction; release means for moving said detent to a latch released position; locking means comprising a locking lever pivotally mounted on said frame for movement between an unlocked position wherein said release means is operable and a locked position wherein said lever blocks release movement of said detent; and means for blocking movement of said locking lever into locked position when said latching means is in safety latched position comprising a foot on said latch plate which lies in the path of movement of said lever when the latch plate is in safety latched position only, said foot being located out of the path of movement of said lever when said latch plate is in said fully latched and said unlatched positions.

9. Apparatus of the character claimed in claim 8, wherein said latch plate has a cam surface on its periphery for slidably supporting said detent to permit overtravel of the latching means in a latching direction.

10. In a vehicle door latch having a latch frame, latching means movably mounted on the frame and including a bolt, movable detent means for holding the latching means against movement in at least one direction, outside operating means for opening the door, and inside operating means for opening the door, apparatus of the character described, including: an operating lever mounted on the frame for movement in one direction from a normal door latched position to a locked position wherein it renders said outside operating means ineffective, and movable in another direction from said normal door latched position to a door unlatched position; an overcenter spring connected between said lever and the frame, said spring moving overcenter during movement of said lever between normal door latched position and door locked position and said spring yieldably biasing said lever in said respective two positions; and means on said frame blocking said spring against movement during movement of said lever from said normal door latched position to said door unlatched position, said lever having a lost motion connection with said spring which permits movement of the lever while the spring is blocked.

11. In a vehicle door latch having a latch frame, latching means movably mounted on the frame and including a bolt, a detent pivotally mounted on the frame for holding the latching means against movement in a door opening direction, outside operating means for moving said detent to free the bolt, and inside operating means for moving said detent to permit movement of the latching means in a door opening direction, apparatus of the character described, including: an operating lever pivotally mounted on the frame for movement in one direction from a normal door latched position to a locked position wherein the outside operating means is rendered ineffective and movable in the opposite direction from said normal door latched position to a door unlatched position; means connecting said operating lever to said inside operating means; an overcenter spring connected between said lever and the frame, said spring moving overcenter during movement of said lever between normal door latched position and door locked position and said spring yieldably biasing said lever in said respective two positions; and a tab on said frame in the path of movement of said spring for blocking said spring against movement during movement of said lever from normal door latched position to door unlatched position, said lever having a lost motion connection with said spring which permits movement of the lever to door unlatched position while movement of the spring is blocked.

12. In a vehicle door latch having a latch frame, latching means mounted on the frame and including a latch bolt, detent means for holding the latching means against movement in at least one direction, outside operating means for the latching means, and inside operating means for the latching means, the combination comprising, an operating lever comprising a portion of said inside operating means and mounted on said frame for movement from a normal door latched position to a locked position wherein the lever renders the outside operating means ineffective, and movement from said normal door latched position to a door unlatched position, means operatively connected to said lever for selectively and alternately biasing said lever to either normal door latched position or locked position, means for blocking the action of said biasing means during movement of said lever from said normal door latched position to said door unlatched position, and means interconnecting said lever and said biasing means permitting movement of said lever while said biasing means is blocked.

References Cited in the file of this patent

UNITED STATES PATENTS

| | | |
|---|---|---|
| 2,231,075 | Lakin | Feb. 11, 1941 |
| 2,552,815 | Roethel | May 15, 1951 |
| 2,665,159 | Allen | Jan. 5, 1954 |
| 2,835,526 | Van Voorhees | May 20, 1958 |
| 2,946,613 | Roethel | July 26, 1960 |